US012779785B2

(12) United States Patent
Chen et al.

(10) Patent No.: US 12,779,785 B2
(45) Date of Patent: Nov. 3, 2026

(54) POWDER DEPOSITION APPARATUSES AND METHODS

(71) Applicant: Wisconsin Alumni Research Foundation, Madison, WI (US)

(72) Inventors: Lianyi Chen, Middleton, WI (US); Luis Izet Escano, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 127 days.

(21) Appl. No.: 18/439,950

(22) Filed: Feb. 13, 2024

(65) Prior Publication Data

US 2025/0256461 A1 Aug. 14, 2025

(51) Int. Cl.

| | |
|---|---|
| ***B29C 64/214*** | (2017.01) |
| ***B22F 10/37*** | (2021.01) |
| ***B29C 64/141*** | (2017.01) |
| ***B29C 64/255*** | (2017.01) |
| ***B29C 64/393*** | (2017.01) |
| ***B33Y 10/00*** | (2015.01) |
| ***B33Y 30/00*** | (2015.01) |
| ***B33Y 50/02*** | (2015.01) |

(52) U.S. Cl.

CPC ............ *B29C 64/393* (2017.08); *B22F 10/37* (2021.01); *B29C 64/141* (2017.08); *B29C 64/214* (2017.08); *B29C 64/255* (2017.08); *B33Y 10/00* (2014.12); *B33Y 30/00* (2014.12); *B33Y 50/02* (2014.12)

(58) Field of Classification Search

None

See application file for complete search history.

(56) References Cited

U.S. PATENT DOCUMENTS

| | | | | |
|---|---|---|---|---|
| 2018/0222114 | A1 | 8/2018 | Ng et al. | |
| 2019/0210294 | A1* | 7/2019 | Hudelson | B33Y 30/00 |
| 2019/0353569 | A1* | 11/2019 | Godfrey | B33Y 30/00 |
| 2020/0384692 | A1* | 12/2020 | Shi | B29C 64/35 |
| 2021/0016501 | A1 | 1/2021 | Petros et al. | |
| 2021/0187845 | A1* | 6/2021 | Colson | B29C 64/153 |
| 2021/0370402 | A1 | 12/2021 | Bayramian et al. | |
| 2022/0410275 | A1 | 12/2022 | Walker et al. | |
| 2023/0286212 | A1 | 9/2023 | Chen et al. | |

OTHER PUBLICATIONS

USPTO. International Search Report and Written Opinion (PCT ISR) dated May 15, 2025 for copending PCT Application No. PCT/US2025/011440, 21 pages, and which application claims priority of the instant U.S. patent application.

* cited by examiner

*Primary Examiner* — Binu Thomas
(74) *Attorney, Agent, or Firm* — Mueting Raasch Group

(57) ABSTRACT

Aspects of the disclosure are directed to powder deposition apparatuses and methods. Certain aspects involve a powder bed including sidewalls and a stepped substrate having respective steps at different thicknesses relative to the other steps, the sidewalls and stepped substrate forming an enclosure to hold powder. A powder spreader, including a blade and an actuator, may actuate the blade across an upper surface of the powder bed and therein spread powder within the powder bed over the stepped substrate. An imaging apparatus, including a camera, may be utilized to image the powder within the powder bed and, via the imaging, provide an output indicative of spreading characteristics of the powder relative to the respective steps.

20 Claims, 15 Drawing Sheets

POWDER DEPOSITION APPARATUSES AND METHODS

BACKGROUND

For many applications, it is desirable to provide powder-based layers for utilization in the formation of manufactured works. For instance, certain additive manufacturing approaches utilize powder beds and spreaders to provide layers of powder, which may then be processed to generate structures.

The characteristics of powders, such as those utilized in powder bed-based additive manufacturing processes, can be important for controlling properties of as-built structures. However, assessing characteristics such as those relating to the ability to spread powders can be challenging. For instance, size distribution, shape, and humidity may factor into the ability to spread powders. Poorly spread powders may result in defects in additively manufactured parts, hampering broader adoption.

These and other matters have presented challenges to powder spreading apparatuses and approaches, for a variety of applications.

SUMMARY

Various example embodiments are directed to powder spreading, related apparatuses, testing approaches, applications, and related manufacture. Such embodiments may be useful for testing and implementing a variety of types of additive manufacturing approaches.

As may be implemented in accordance with one or more embodiments, an apparatus includes a powder bed and a powder spreader. The powder bed includes sidewalls and a substrate. The substrate has a lower surface and a stepped upper surface having respective steps at different heights relative to the other steps, in which the sidewalls and substrate form an enclosure to hold powder. The upper surface exhibits characteristics selected from the group of: a smooth surface, a textured surface, surface portions having different materials, and a combination thereof. The powder spreader includes a blade and an actuator to actuate the blade across an upper surface of the powder bed, and therein spread powder within the powder bed over the stepped substrate. The blade has a surface exhibiting characteristics selected from the group of: a smooth surface; a textured surface, surface portions having different materials, and a combination thereof.

Another embodiment is directed to a powder deposition apparatus having a powder bed, a powder spreader, and an imaging apparatus. The powder bed includes sidewalls and a stepped substrate having respective steps at different thicknesses relative to the other steps, the sidewalls and stepped substrate forming an enclosure to hold powder. The powder spreader includes a blade and an actuator to actuate the blade across an upper surface of the powder bed and therein spread powder within the powder bed over the stepped substrate. The imaging apparatus includes a camera to image the powder within the powder bed and, via the imaging, provide an output indicative of spreading characteristics of the powder relative to the respective steps.

Method-based embodiments may be carried out as follows. Powder is dispensed into a powder bed including sidewalls and a stepped substrate having respective steps at different thicknesses relative to the other steps, the sidewalls and stepped substrate forming an enclosure to hold the powder. Using a powder spreader including a blade and an actuator, the powder is spread within the powder bed over the stepped substrate by actuating the blade across an upper surface of the powder bed. Using an imaging apparatus including a camera, the powder within the powder bed is imaged, and an output indicative of spreading characteristics of the powder relative to the respective steps is provided, via the imaging.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description and in connection with the accompanying drawings, in which:

FIGS. 1A-1D show an apparatus as may be implemented in accordance with one or more embodiments, in which:

FIG. 1A shows a first view of the apparatus;

FIG. 1B shows a lateral view and spreading implementation of the apparatus shown in FIG. 1A;

FIG. 1C shows a top view of the apparatus; and

FIG. 1D shows a top view of a powder bed of the apparatus as shown in FIG. 1C;

Figure 1A:
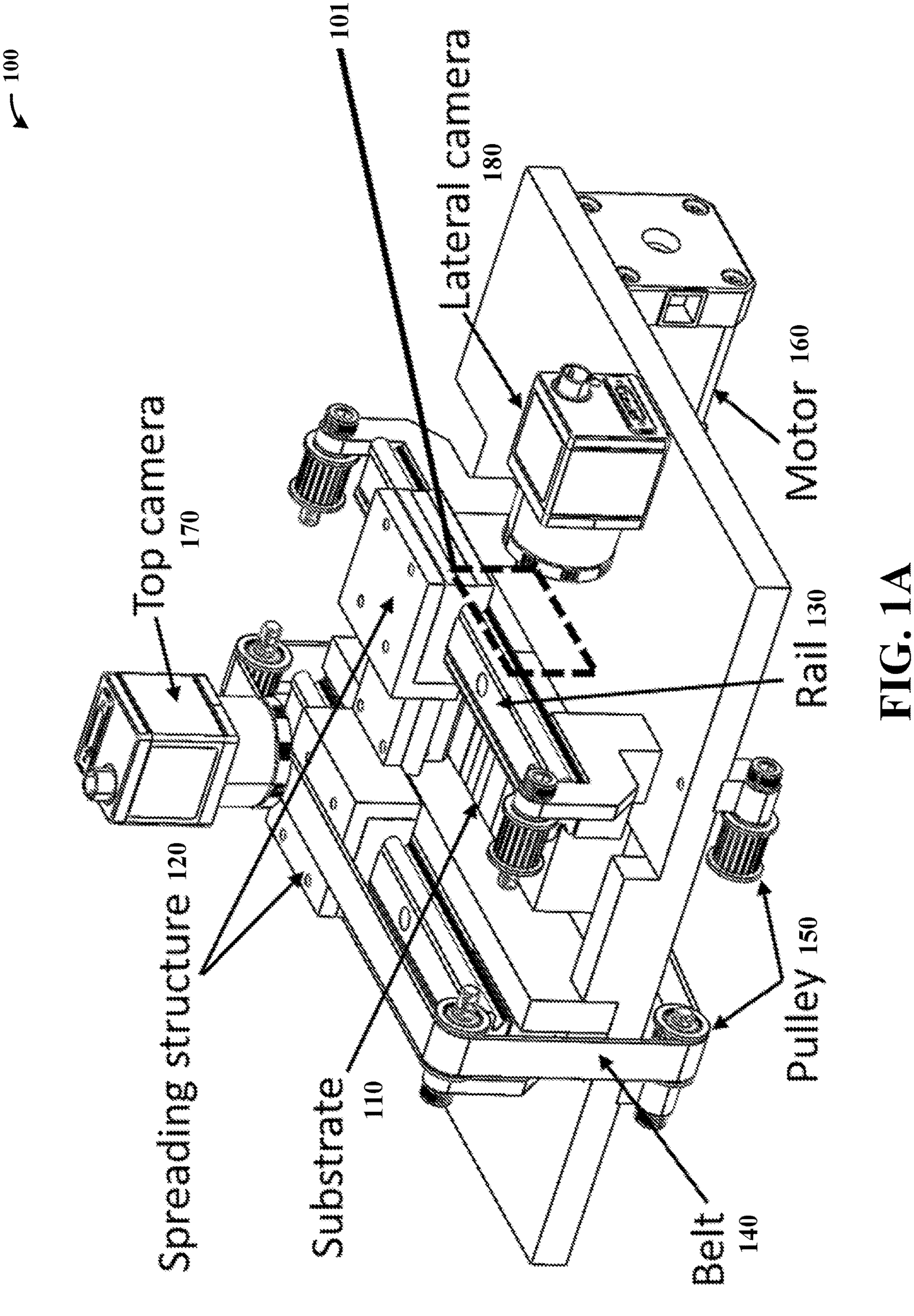

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

DETAILED DESCRIPTION

Aspects of the present disclosure are believed to be applicable to a variety of different types of articles of manufacture, apparatuses, systems and methods involving powder spreaders. In certain implementations, aspects of the present disclosure have been shown to be beneficial when used in the context of research and testing involving materials of differing characteristics, as may involve thickness, size, surface topology and more. Certain such aspects may involve testing of powder spreaders utilized for additive manufacturing (e.g., 3D printing). While not necessarily so limited, various aspects may be appreciated through a discussion of examples using such exemplary contexts.

According to various example embodiments, a high throughput powder spreadability testing system provides testing for powder spreadability involving one or more of multiple layer thicknesses, multiple substrate materials, multiple blade shapes and multiple blade materials. Testing may be carried out in a single test using a testing plate. Further, powder size and size distribution, shape and shape distribution, repose angle, avalanche angle, and breaking energy may be obtained in the same test. The testing plate may utilize one or more of a stepped substrate, a variety of textures and multiple types of re-coaters.

Certain embodiments are directed to additive manufacturing processes in which powders are spread into a thin layer (e.g., 100 micrometers or less). The effect of manufacturing conditions as may relate to boundaries of the layers and manufacturing componentry, such as chemistry, hardness, roughness, substrate geometry and spreading blade geometry, can be ascertained using such processes and related componentry as characterized herein. Powder spreadability may be tested at multiple layer thicknesses, multiple substrate materials, multiple blade shapes and multiple blade materials in one single test based on the needs of the application. Powder size and size distribution, shape and shape distribution, repose angle, avalanche angle, and breaking energy can also be obtained simultaneously in a single test.

Another embodiment is directed to a powder deposition apparatus having a powder bed, a powder spreader, and an imaging apparatus. The powder bed includes sidewalls and a stepped substrate that form an enclosure to hold powder, in which the stepped substrate has respective steps at different thicknesses relative to the other steps. The powder spreader includes a blade and an actuator to actuate the blade across an upper surface of the powder bed, for spreading powder within the powder bed and over the stepped substrate. The imaging apparatus includes a camera to image the powder within the powder bed. Via the imaging, an output indicative of spreading characteristics of the powder relative to the respective steps, is provided.

The various embodiments characterized herein may be utilized for a variety of manufacturing processes, and with a variety of types of materials/powders. For instance, the apparatuses and methods characterized herein may be utilized in connection with one or more of laser powder bed fusion, electron beam powder bed fusion, binder jetting, multi-jet fusion and selective laser sintering processes. Further, materials such as metal, polymer, ceramic, and composites involving metal and/or other materials, can be utilized.

Powder spreadability may be characterized in a variety of manners, utilizing apparatuses and/or methods as characterized herein. For instance, powder bed denudation (area without powder) can be assessed for each substrate feature (e.g., thickness, texture, material), using the camera to quantify powder spreadability for each different substrate feature.

Another approach involves assessing al layer thickness and/or surface characteristic (e.g., roughness, or texture) that leads to the formation of a powder bed that does not exhibit denudation. In connection with these aspects, it has been recognized/discovered that powder spreading behavior may depend on the layer thickness and substrate roughness, in which thicker and/or rougher substrates may facilitate powder spreading. Using stepped substrates as characterized herein, which provide varied layer thicknesses and/or varied roughness, layer thickness and/or roughness for particular powder types that exhibit denudation-free spreading can be ascertained.

The imaging apparatus may include, for example, a computer processor or other logic circuitry programmed to assess the imaged powder and provide the output. For instance, images may be assessed by pixel analysis to identify and quantify the area corresponding to powder bed denudation caused by each substrate/spreader feature (e.g., thickness, texture, material). The pixel analysis may also assess surface roughness and a shape aspect of powder present on each substrate feature (e.g., the powder size and size distribution, and the powder shape and shape distribution).

The stepped substrate may be configured in one or more of a variety of manners. One or more of the steps may include a plurality of disparate surface textures, in which the imaging apparatus provides the output indicative of different spreading characteristics of the powder for each of the disparate surface textures. One or more of the steps may also have a plurality of disparate surface materials (in addition to one or more steps having disparate surface textures), in which the imaging apparatus provides the output indicative of different spreading characteristics of the powder for each of the disparate surface materials. In some embodiments, one or more of the steps may a plurality of disparate surface materials, without necessarily involving disparate surface textures, in which the imaging apparatus provides the output indicative of different spreading characteristics of the powder for each of the disparate surface materials.

In certain embodiments, the blade has respective portions having different surface characteristics, such as different shapes, different textures, different materials, or a combination thereof. The imaging apparatus provides the output indicative of different spreading characteristics of regions of the powder respectively corresponding to one of the disparate surface characteristics. This approach may be combined with one or more of the above approaches involving disparate surface characteristics of the stepped substrate. For instance, one or more of the steps may have a plurality of disparate surface textures, in which the output is provided to indicate different spreading characteristics of the powder for each of the disparate surface textures in combination with the surface characteristics of the respective portions of the blade. One or more of these steps may have a plurality of disparate surface materials, in which the imaging apparatus provides the output indicative of different spreading characteristics of the powder for each of the disparate surface materials (and surface textures) in combination with the surface characteristics of the respective portions of the blade. Alternatively, one or more of the steps may have a plurality of disparate surface materials and the imaging apparatus provides the output indicative of different spreading characteristics of the powder for each of the disparate surface materials in combination with the surface characteristics of the respective portions of the blade.

In accordance with method-based embodiments, powder is dispensed into a powder bed including sidewalls and a stepped substrate. The stepped substrate has respective steps at different thicknesses relative to the other steps. The sidewalls and stepped substrate form an enclosure to hold the powder. The powder is spread within the powder bed over the stepped substrate by actuating a blade of a powder spreader, having the blade and an actuator, across an upper surface of the powder bed. Spreading the powder may involve, for example, creating powder having different thicknesses corresponding to the thicknesses of the respective steps. The powder within the powder bed is imaged with imaging apparatus including a camera, and an output indicative of spreading characteristics of the powder relative to the respective steps is provided via the imaging.

Such method-based embodiments may be carried out using a variety of configurations of the steps, involving their arrangement and surface characteristics. For instance, one or more of the steps may have a plurality of disparate surface textures, a plurality of disparate surface materials, or a combination thereof. The output may thus be indicative of different spreading characteristics of the powder for each of the disparate surface textures, surface materials, and/or a combination thereof.

These method-based approaches may utilize a blade with respective portions having different surface characteristics, such as different shapes, different textures, different materials, or a combination thereof. The output is provided to indicate different spreading characteristics of regions of the powder respectively corresponding to one of the disparate surface characteristics. These respective blade characteristics may be utilized in connection with variations in the stepped substrate, as characterized above. For instance, one or more of the steps may have a plurality of disparate surface textures, a plurality of disparate surface materials, or a combination thereof. The output may be indicative of different spreading characteristics of the powder for each of the respective conditions.

Turning now to the figures, FIGS. 1A-1D show an apparatus 100 as may be implemented in accordance with one or more embodiments. Referring to FIG. 1A, the apparatus 100 includes a stepped substrate 110 that may be implemented in accordance with various embodiments characterized herein, such as to provide varied heights (and related variations in thicknesses of powder), different surface textures, and/or different surface materials. The apparatus 100 further includes a spreading structure 120, which actuates along a rail 130 over the stepped substrate. A belt 140, pulleys 150 and motor 160 (to drive the belt) may be used to actuate the spreading structure 120. Top camera 170 and lateral camera 180 may be utilized to image powder on the stepped substrate, for assessing characteristics such as spreadability.

Figure 1B:
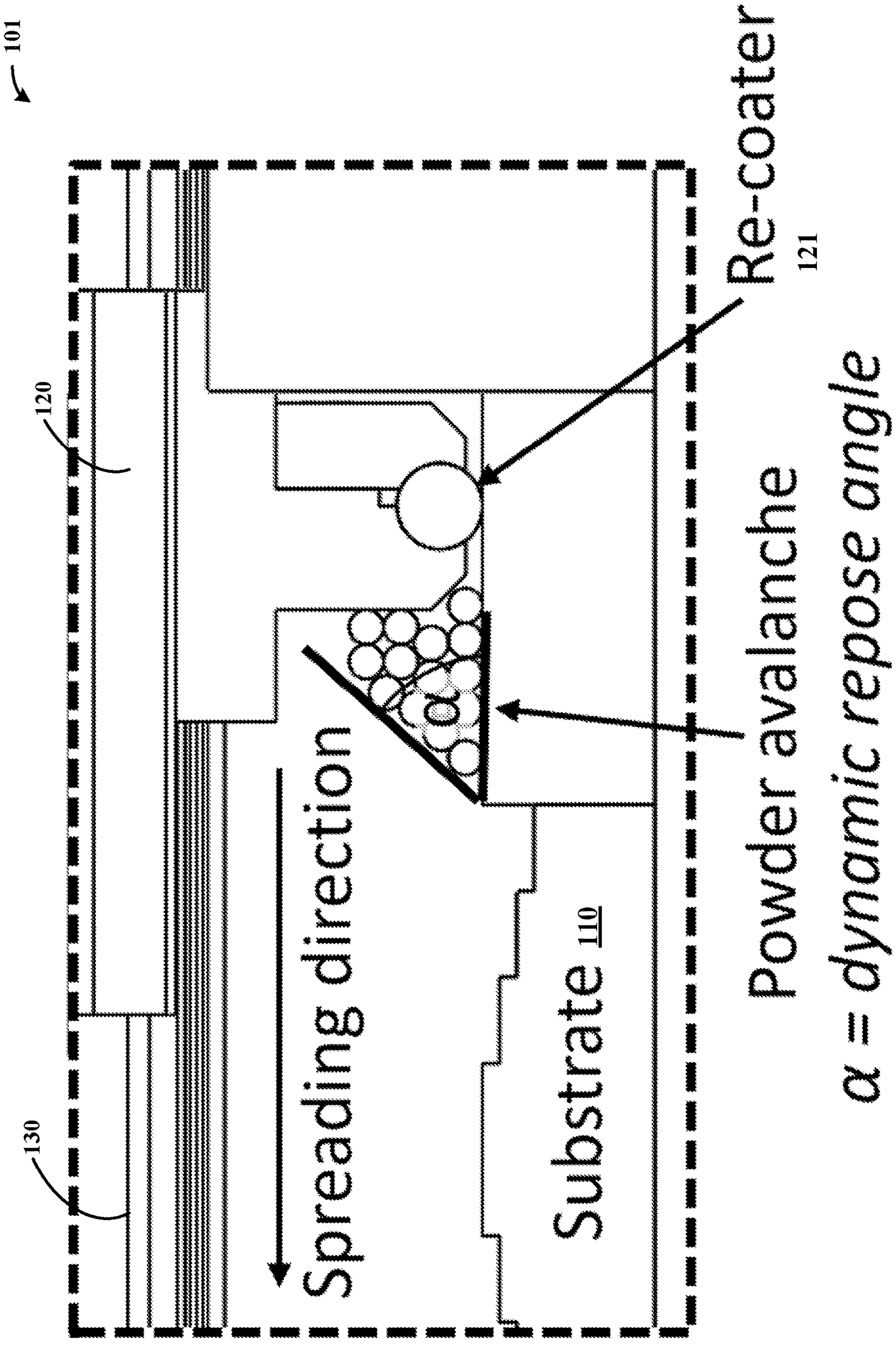

FIG. 1B shows a lateral view and spreading implementation of the apparatus shown in FIG. 1A, at inset 101 as depicted in FIG. 1A. A re-coater 121 is coupled to the spreading structure 120, and utilized to spread powder over the substrate 110 as the spreading structure is actuated along the rail 130. By way of example, a powder avalanche is depicted on the leading edge of the re-coater. Utilizing the re-coater, powder can be spread over the substrate with a planar upper surface, and with the underlying steps setting the heights.

Figure 1C:
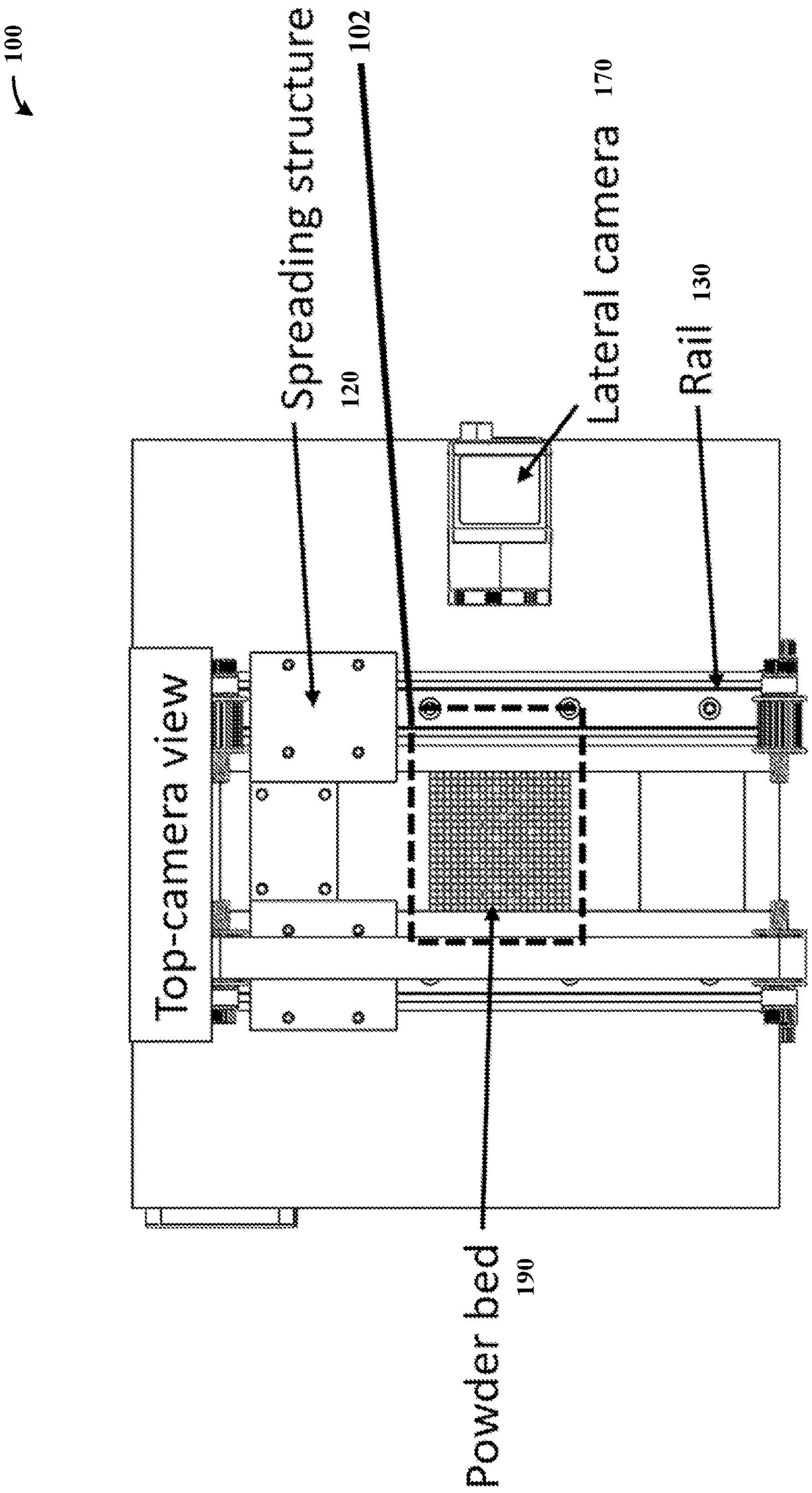
Figure 1D:
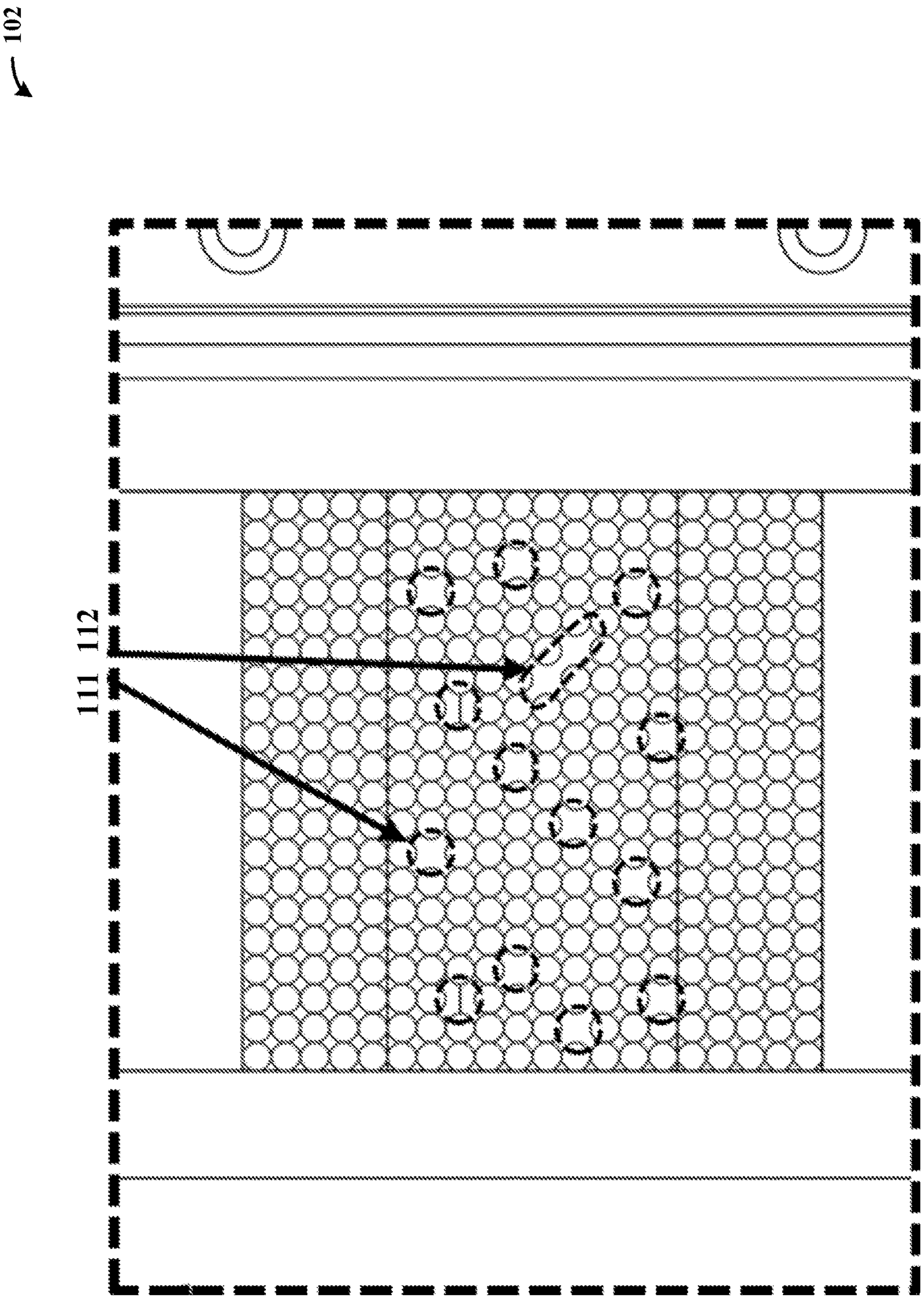
Figure 2:
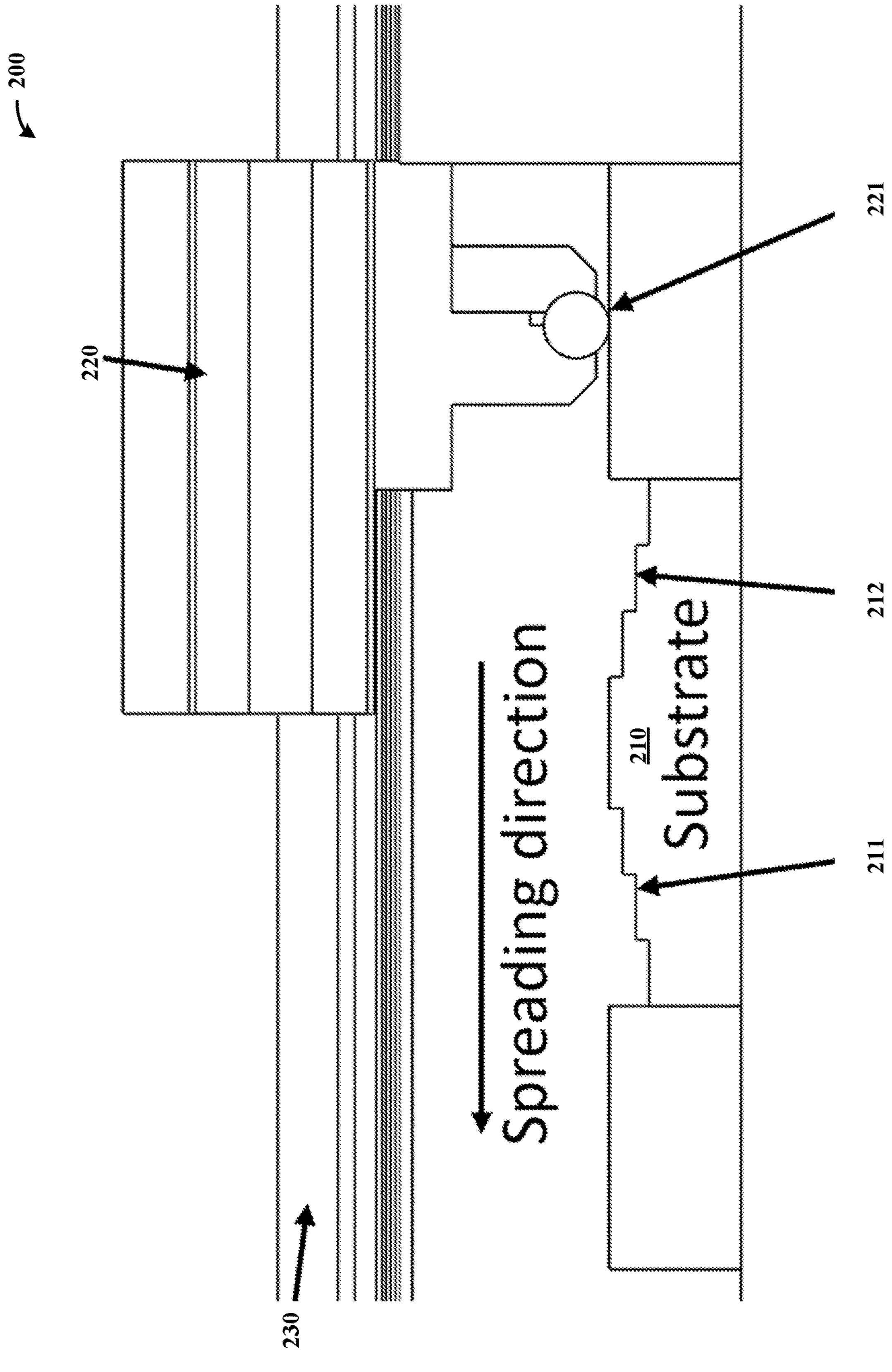
FIG. 2 shows an apparatus and spreading implementation involving multi-layer thicknesses over a stepped substrate, as may be implemented in accordance with various embodiments.

FIG. 1C shows a top view of the apparatus 100, as may be viewed by camera 170 for imaging the powder bed 190. FIG. 1D shows a top view of the powder bed 190 as shown at inset 102 in FIG. 1C, as may be imaged by the camera 170. Regions 111 and 112 depict denudation, where powder is not properly disbursed. As such, the camera 170 may be programmed to differentiate such regions from other regions of powder, and therein provide an indication of powder spreadability at different regions of the substrate 110.

The components shown in the following FIGS. 2-9 may be implemented in accordance with the apparatus 100 shown in FIGS. 1A-1D. Beginning with FIG. 2, an apparatus 200 is shown with a spreading implementation involving multilayer thicknesses over a stepped substrate 210, as may be implemented in accordance with various embodiments. The apparatus includes a spreading structure 220 having a re-coater 221, and which actuates over a rail 230. The substrate 210 has respective steps including steps 211 and 212, at different heights. The substrate 210 thus provides regions of differing thicknesses of powder on the substrate, when the powder is spread evenly relative to an upper surface thereof. These regions may be imaged to assess spreadability of powder at the respective thicknesses.

Figure 3:
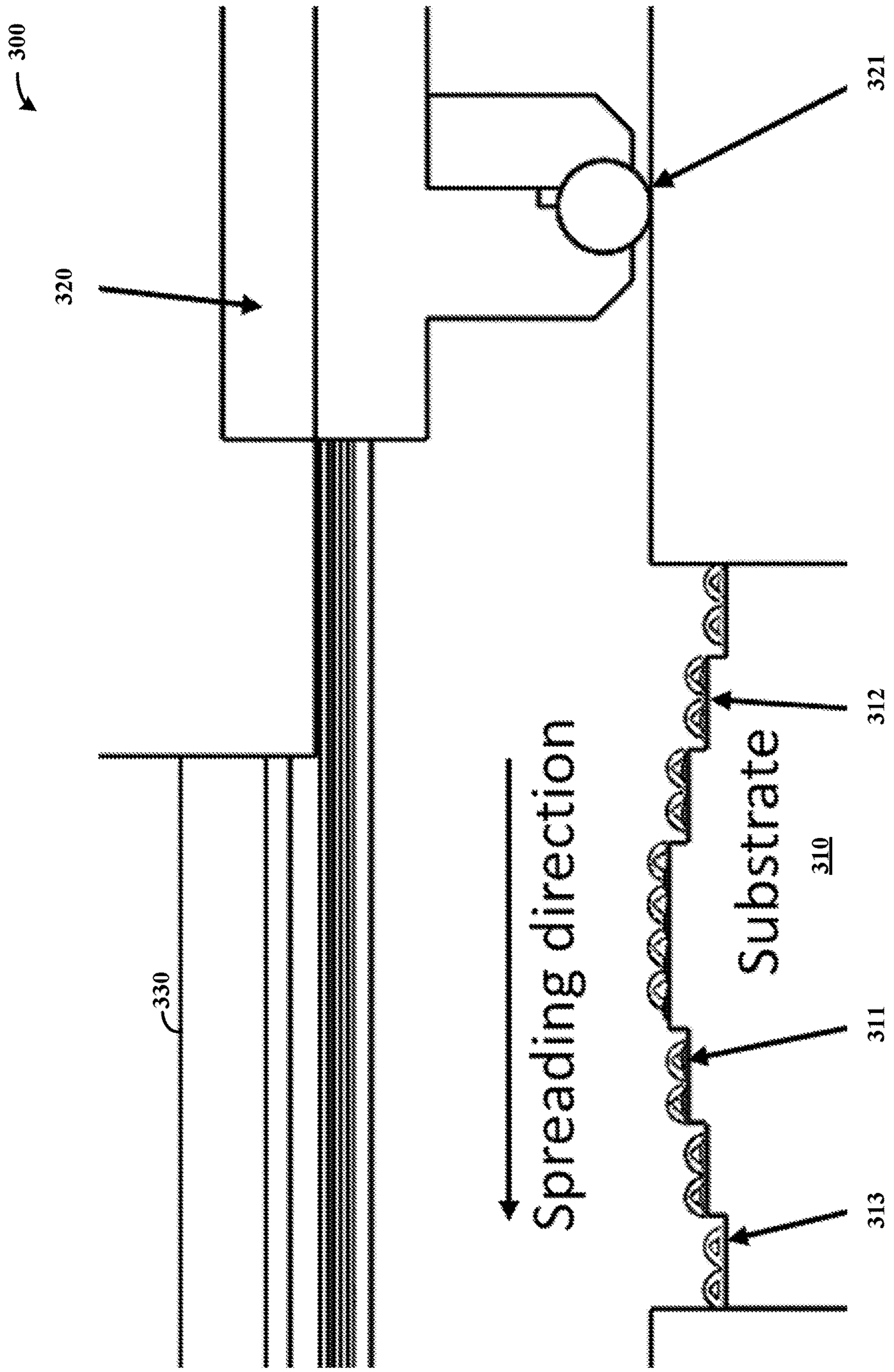
FIG. 3 shows an apparatus and spreading implementation with multiple textures on an underlying stepped substrate, as may be implemented in accordance with various embodiments.

FIG. 3 shows another apparatus 300 and spreading implementation with multiple textures on an underlying stepped substrate 310. The apparatus 300 also includes a spreading structure 320 having a re-coater 321, and which actuates along a rail 330 for spreading powder over the substrate 310. Various stepped regions of the substrate, including 311, 312 and 313, may be implemented with different surface textures. These textures may be assessed with respect to spreadability of powder thereon, for example by imaging with a camera as depicted in FIG. 1A.

Figure 4:
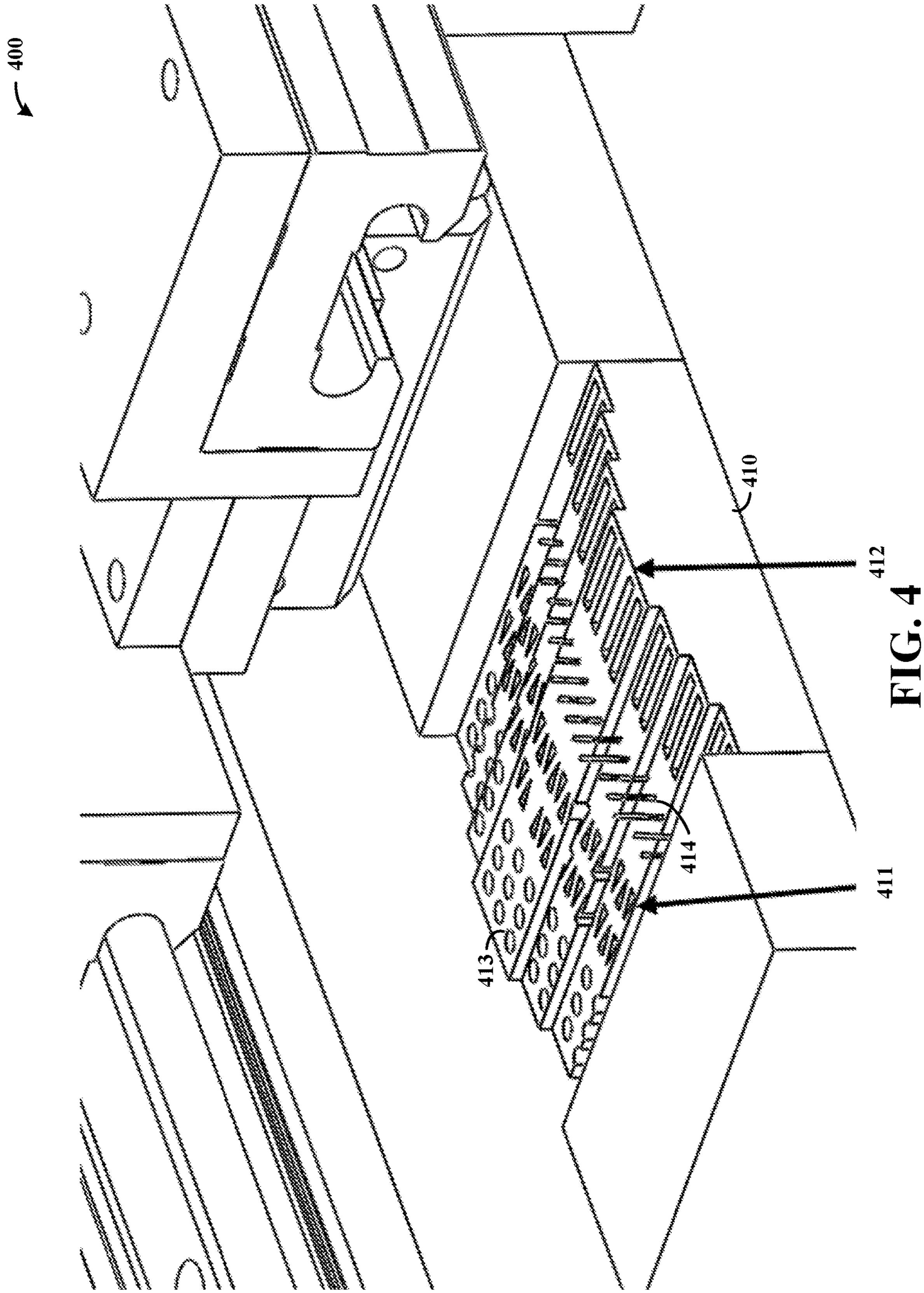
FIG. 4 shows an apparatus and spreading implementation with different materials on an underlying stepped substrate, as may be implemented in accordance with various embodiments.

FIG. 4 shows an apparatus 400 and spreading implementation with different materials on an underlying stepped substrate 410, as may be implemented in accordance with various embodiments. Materials 411, 412, 413 and 414 are located on different regions of each of the steps, such that each step provides four different materials and that these materials are provided at different thicknesses. As such, powder spreading can be assessed for each of the four different materials at different thicknesses of powder corresponding to each of the respective step heights.

Figure 5:
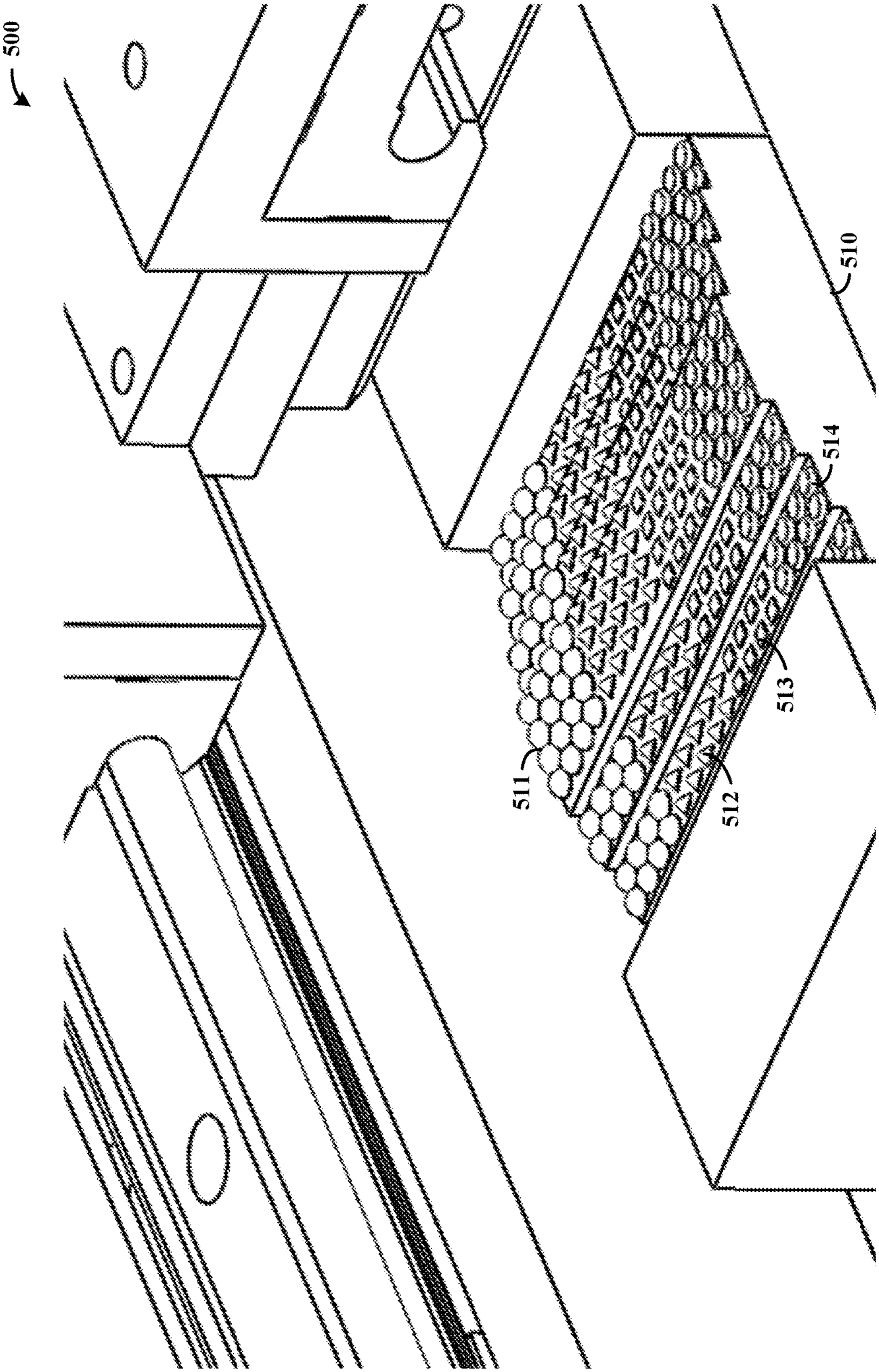
FIG. 5 shows an apparatus and spreading implementation with multiple textures on an underlying stepped substrate, as may be implemented in accordance with various embodiments.

FIG. 5 shows an apparatus 500 and spreading implementation with multiple textures on an underlying stepped substrate 510, as may be implemented in accordance with various embodiments. Texture regions 511, 512, 513 and 514 are located on each of a plurality of steps as shown. Each step provides four different textures, with the respective steps providing different thicknesses of powder thereon. As such, powder spreading can be assessed for each of the four different textures at different thicknesses of powder corresponding to each of the respective step heights.

Figure 6:
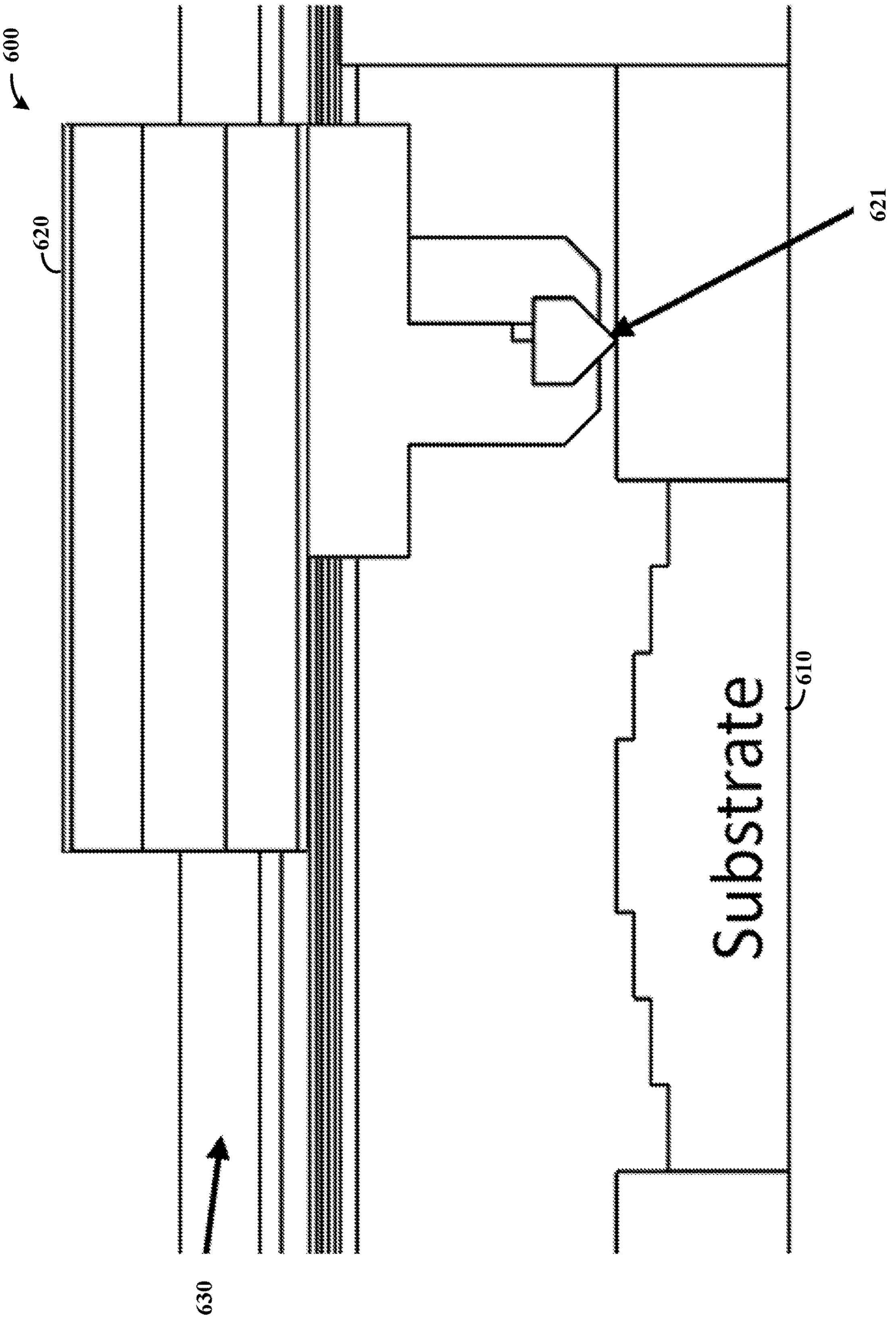
FIG. 6 shows an apparatus and spreading implementation with a blade-shaped re-coater, as may be implemented in accordance with various embodiments.

FIG. 6 shows an apparatus 600 and spreading implementation with a blade-shaped re-coater 621, as may be implemented in accordance with various embodiments. The apparatus 600 includes a spreading structure 620 that actuates along a rail 630 (e.g., as described with FIG. 1A), to move the re-coater 621 over powder dispensed on stepped substrate 610.

Figure 7:
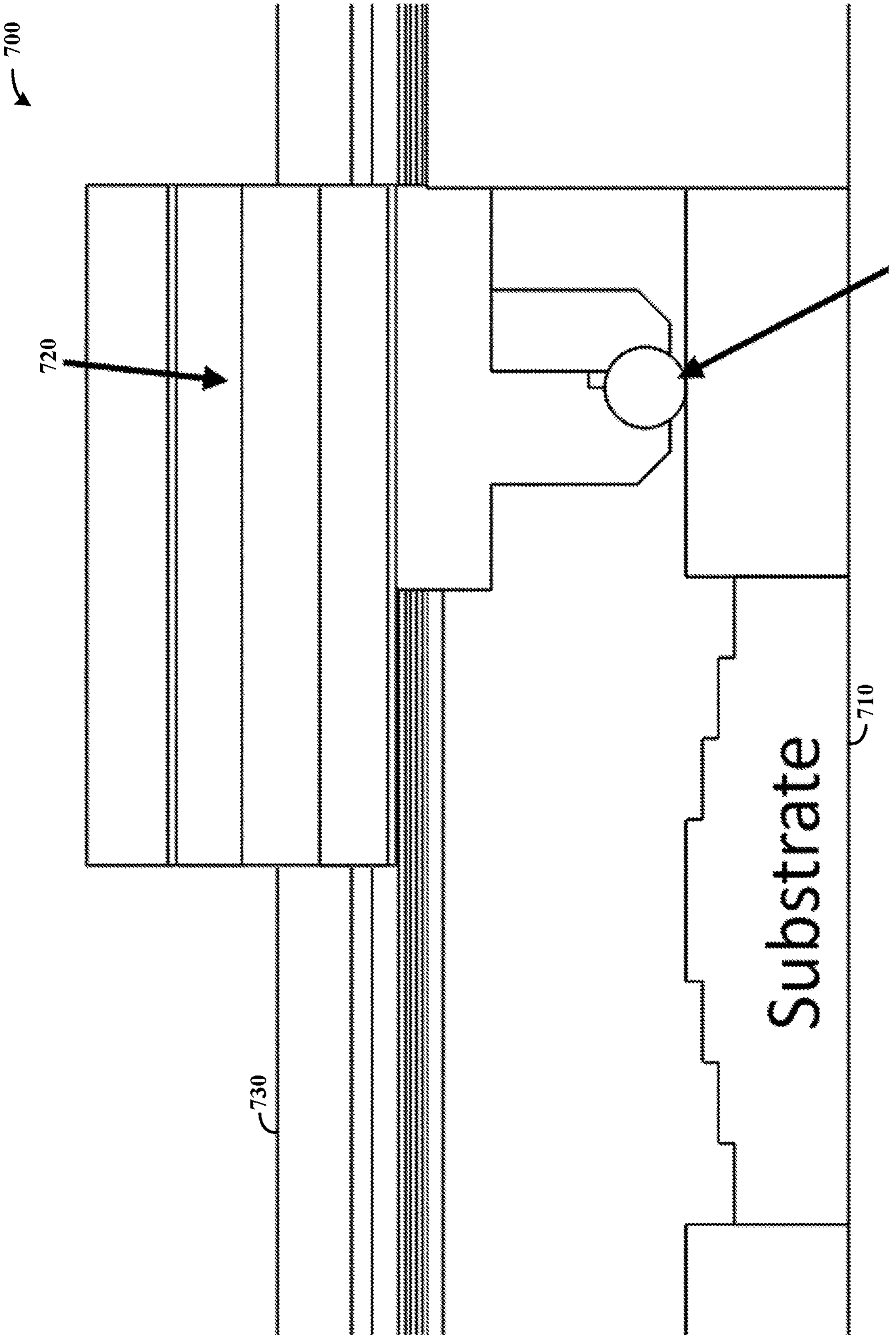
FIG. 7 shows an apparatus and spreading implementation with a round-shaped re-coater, as may be implemented in accordance with various embodiments.

FIG. 7 shows an apparatus 700 and spreading implementation with a round-shaped re-coater 721, as may be implemented in accordance with various embodiments. The apparatus 700 includes a spreading structure 720 that actuates along a rail 730 to move re-coater 721 over substrate 721, and therein to spread powder dispensed thereupon.

Figure 8:
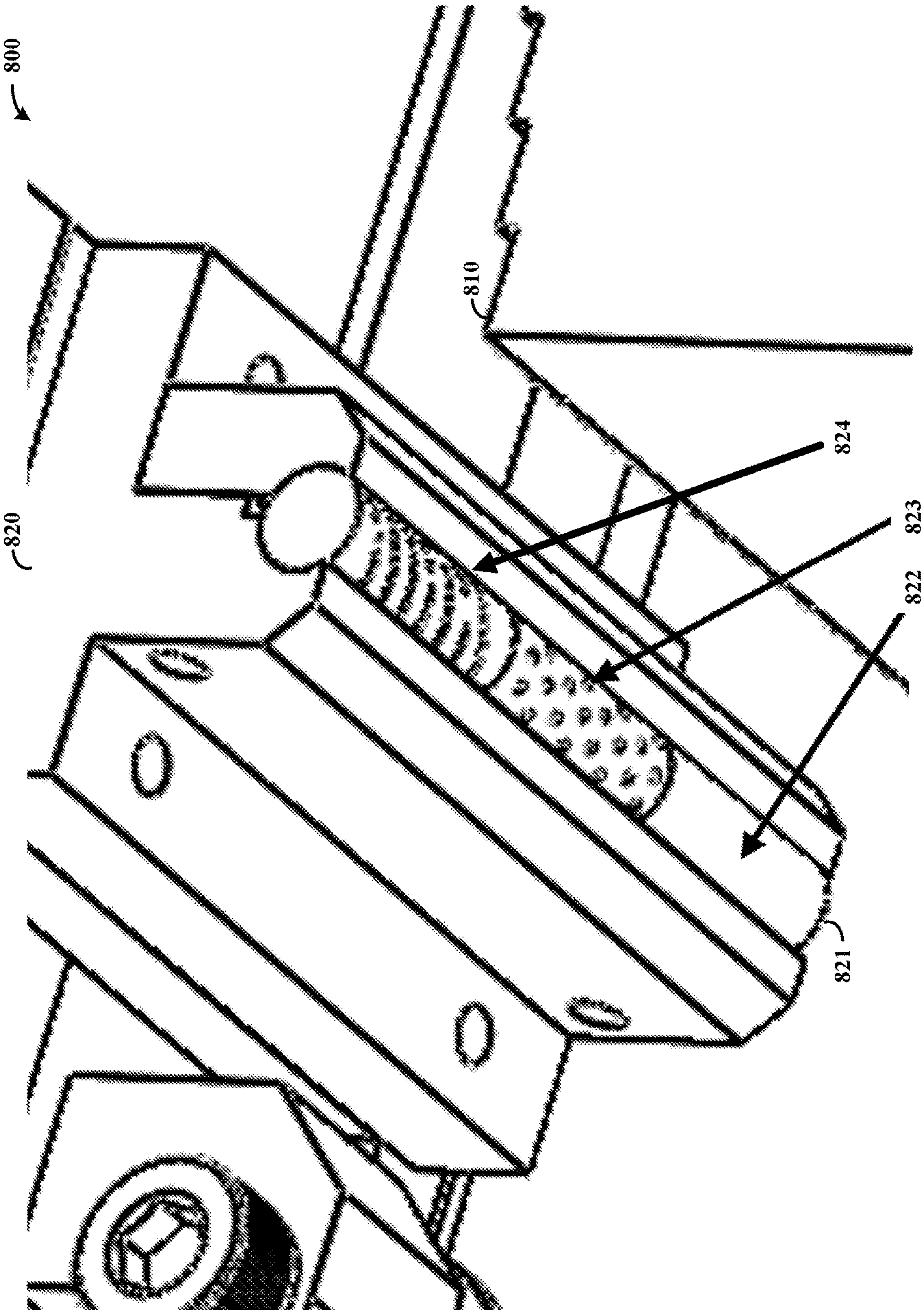
FIG. 8 shows an apparatus and spreading implementation with a round-shaped re-coater having different materials, as may be implemented in accordance with various embodiments.

FIG. 8 shows an apparatus 800 and spreading implementation with a spreading structure 820 having a round-shaped re-coater 821, as may be implemented in accordance with various embodiments. The re-coater 821 has respective portions 822, 823 and 824 having different materials. This re-coater 821 may be passed over a stepped substrate 810, for example in a manner as shown in FIG. 1B, to spread powder across the substrate.

Figure 9:
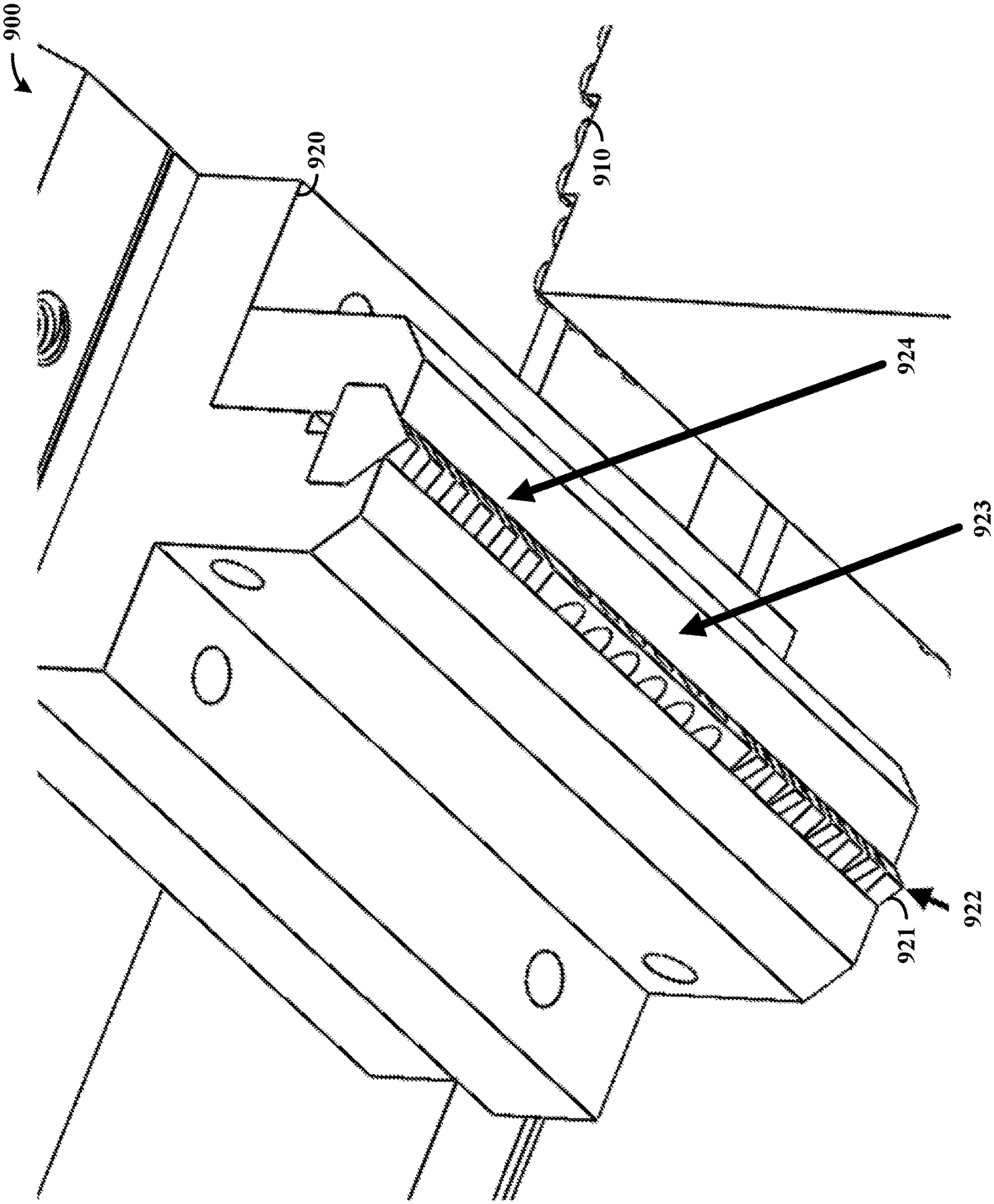
FIG. 9 shows an apparatus and spreading implementation with a blade-shaped re-coater having different materials, as may be implemented in accordance with various embodiments.

FIG. 9 shows an apparatus 900 and spreading implementation with spreading structure 920 having a blade-shaped re-coater 921 with different materials, as may be implemented in accordance with various embodiments. The re-coater 921 is shown with materials 922, 923 and 924, and may be actuated over a stepped substrate 910 (which may further include disparate materials/textures as characterized herein).

Referring to the figures above, various combinations may be implemented to suit particular applications. For instance, round or blade-shaped re-coaters may be implemented in connection with different materials and/or textures thereon, and/or with stepped substrates having different thicknesses, materials and/or textures. As one example, the re-coater 821 of FIG. 8 may be implemented with any of the structures shown in FIGS. 1A-7.

Figure 10:
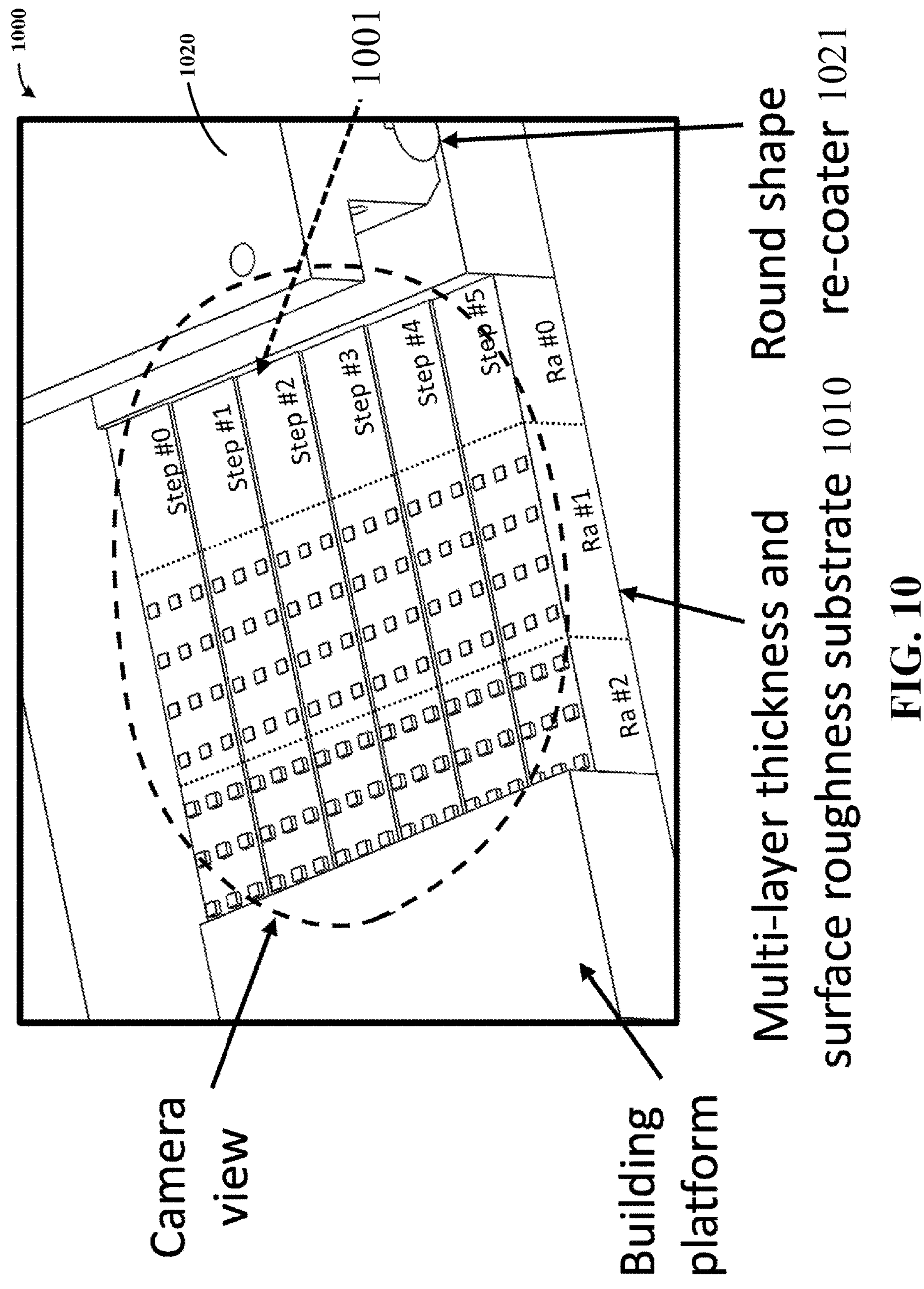
FIG. 10 shows an apparatus and spreading implementation with multiple surface roughness characteristics, as may be implemented in accordance with various embodiments.

FIG. 10 shows an apparatus 1000 and spreading implementation with multiple surface roughness characteristics, as may be implemented in accordance with various embodiments. The apparatus 1000 includes a substrate 1010 having multi-layer steps and varied surface roughness on a building platform, and a spreading structure 1020 having a round-shaped re-coater 1021. Steps 0-5 are shown, with three different roughness types at Ra #0, Ra #1 and Ra #2, which can be used to quantify powder spreadability using the varied layer thickness to provide an indication of the start of denudation, for each of the noted surface roughness types.

Figure 11:
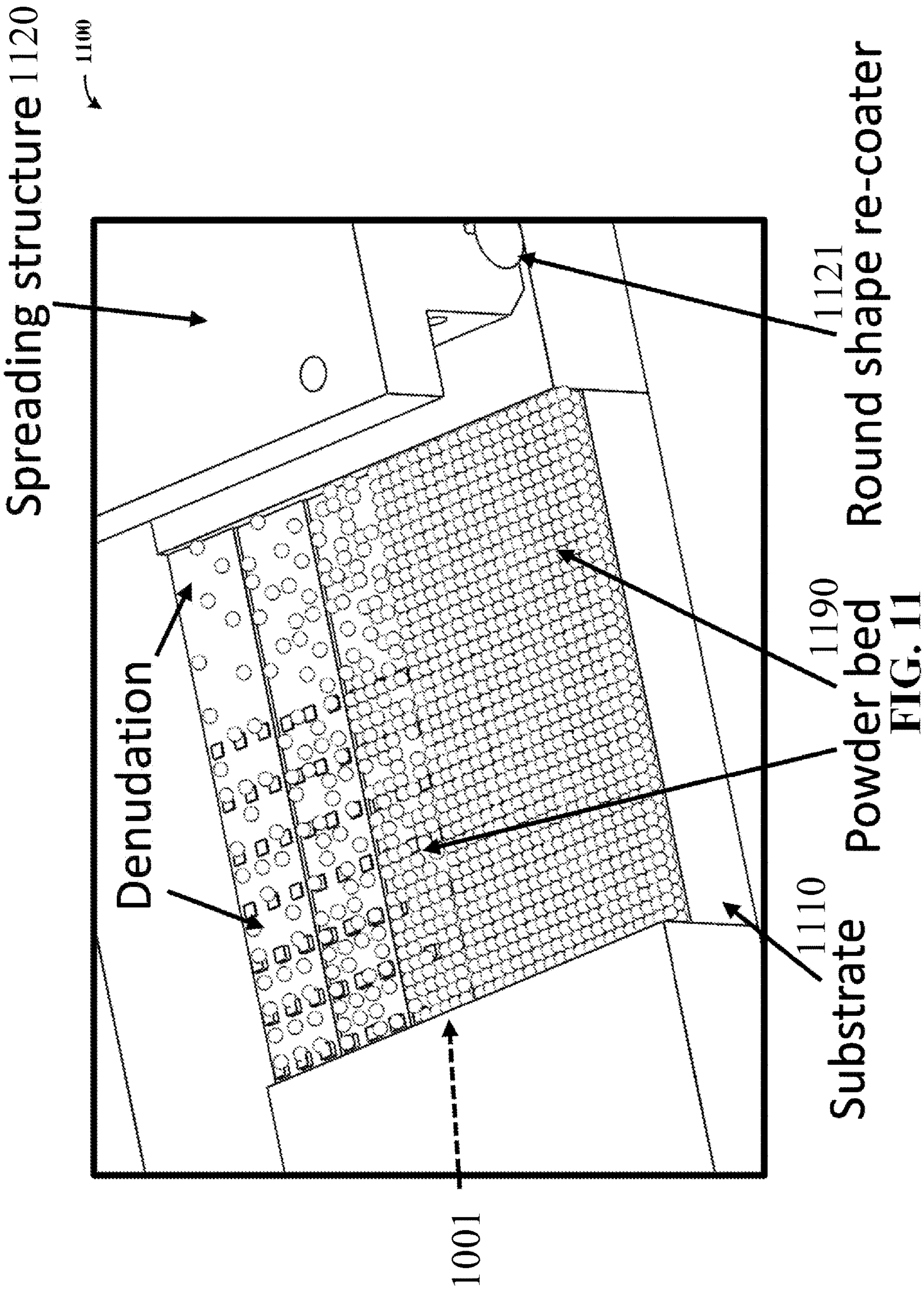
FIG. 11 shows an image of powder spread using multiple surface roughness characteristics, as may be implemented in accordance with various embodiments.

FIG. 11 shows an image of powder spreading in an apparatus 1100 using multiple surface roughness characteristics, as may be implemented in accordance with various embodiments. By way of example, the image may correspond to the camera view depicted in dashed lines in FIG. 10. The apparatus 1100 includes a stepped substrate 1110 and a spreading structure 1120 having a round-shaped re-coater 1121. A powder bed 1190 is provided on the stepped substrate 1110. Denudation regions are noted, where layer thickness and surface roughness characteristics drive issues for powder coverage.

Figure 12:
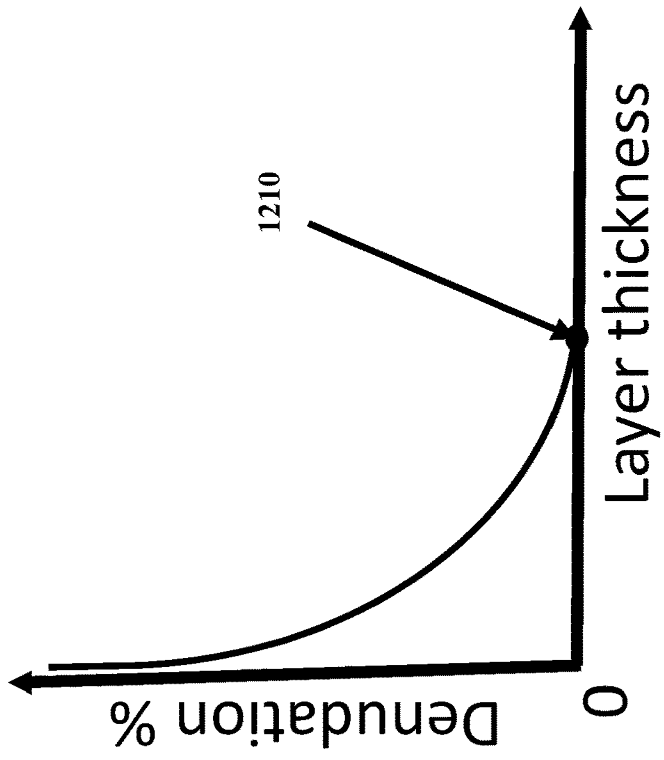
FIG. 12 shows a plot of layer thickness and denudation, as may be implemented in accordance with various embodiments.
Figure 13:
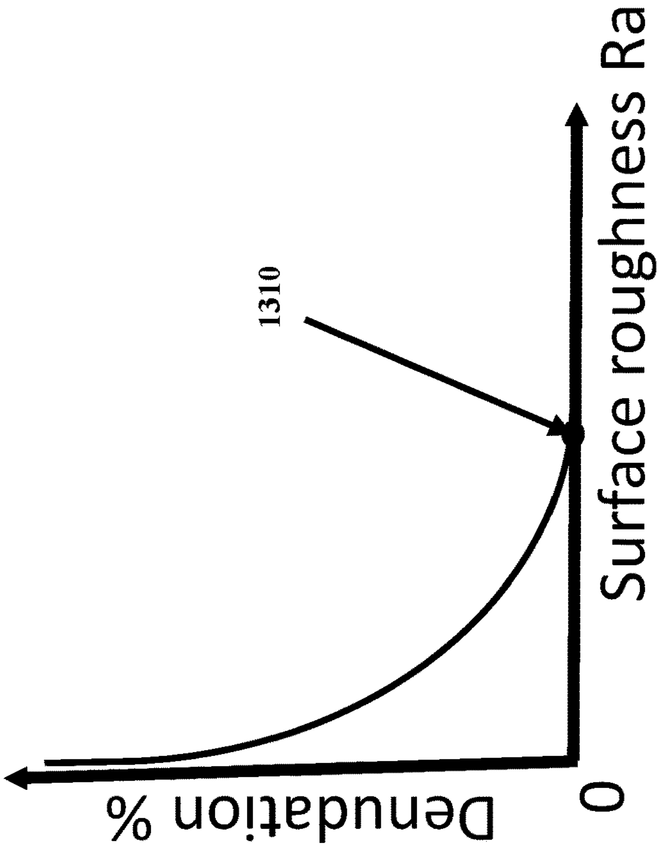
FIG. 13 shows a plot of layer thickness and denudation, as may be implemented in accordance with various embodiments.

FIG. 12 shows a plot of layer thickness and denudation, as may be implemented in accordance with various embodiments. Similarly, FIG. 13 shows a plot of surface roughness and denudation, as may be implemented in accordance with various embodiments. These plots may be implemented in regard to the apparatuses 1000 and 1100 shown in FIGS. 10 and 11, for example with the step 1001. The layer thickness leading to denudation is depicted at 1210, and the surface roughness leading to denudation is depicted at 1310.

Based upon the above discussion and illustrations, those skilled in the art will readily recognize that various modifications and changes may be made to the various embodiments without strictly following the exemplary embodiments and applications illustrated and described herein. For example, a variety of different shapes, textures, and material types may be utilized to suit particular embodiments, including those shown and other combinations. Further, while stepped substrates are shown with ascending and descending characteristics with respect to relative height, a variety of different heights can be provided at different positions, for instance with two or more transitions between increasing and decreasing height. Such modifications do not depart from the true spirit and scope of various aspects of the invention, including aspects set forth in the claims.

What is claimed is:

1. A powder deposition apparatus comprising:

a powder bed including sidewalls and a bottom wall having a stepped substrate having respective steps at different thicknesses relative to the other steps, the sidewalls and stepped substrate forming an enclosure to hold powder;

a powder spreader including a blade and an actuator to actuate the blade across an upper surface of the powder bed and therein spread powder within the powder bed over the stepped substrate; and an imaging apparatus, including a camera, to image the powder within the powder bed and, via the imaging, provide an output indicative of spreading characteristics of the powder relative to the respective steps.

2. The apparatus of claim 1, wherein at least one of the steps has a plurality of disparate surface textures, and wherein the imaging apparatus is configured to provide the output indicative of different spreading characteristics of the powder for each of the disparate surface textures.

3. The apparatus of claim 2, wherein at least one of the steps has a plurality of disparate surface materials, and wherein the imaging apparatus is configured to provide the output indicative of different spreading characteristics of the powder for each of the disparate surface materials.

4. The apparatus of claim 1, wherein at least one of the steps has a plurality of disparate surface materials, and wherein the imaging apparatus is configured to provide the output indicative of different spreading characteristics of the powder for each of the disparate surface materials.

5. The apparatus of claim 1, wherein the blade has respective portions having different surface characteristics, and wherein the imaging apparatus is configured to provide the output indicative of different spreading characteristics of regions of the powder respectively corresponding to one of the different disparate surface characteristics.

6. The apparatus of claim 5, wherein at least one of the steps has a plurality of disparate surface characteristics, and wherein the imaging apparatus is configured to provide the output indicative of different spreading characteristics of the powder for each of the disparate surface characteristics in combination with the surface characteristics of the respective portions of the blade.

7. The apparatus of claim 1, wherein the powder spreader is configured to spread the powder within the powder bed over the stepped substrate by creating powder having different thicknesses corresponding to the thicknesses of the respective steps.

8. The apparatus of claim 1, wherein the blade has different shapes at different locations thereof.

9. The apparatus of claim 1, wherein the imaging apparatus is configured to provide the output based on denudation of the powder in the powder bed, with regions not exhibiting denudation being indicative of desirable powder spreadability.

10. The apparatus of claim 1, wherein the imaging apparatus is configured to provide the output based on denudation of the powder in the powder bed relative to characteristics of the stepped substrate selected from the group of: thickness, texture, material type, roughness, and a combination thereof.

11. A method comprising:

dispensing powder into a powder bed including sidewalls and a bottom wall having a stepped substrate having respective steps at different thicknesses relative to the other steps, the sidewalls and stepped substrate forming an enclosure to hold the powder;

using a powder spreader including a blade and an actuator, spreading the powder within the powder bed over the stepped substrate by actuating the blade across an upper surface of the powder bed;

using an imaging apparatus including a camera, imaging the powder within the powder bed; and via the imaging, providing an output indicative of spreading characteristics of the powder relative to the respective steps.

12. The method of claim 11, wherein at least one of the steps has a plurality of disparate surface textures, and wherein providing the output includes providing the output indicative of different spreading characteristics of the powder for each of the disparate surface textures.

13. The method of claim 12, wherein at least one of the steps has a plurality of disparate surface materials, and wherein providing the output includes providing an output indicative of different spreading characteristics of the powder for each of the disparate surface materials.

14. The method of claim 11, wherein at least one of the steps has a plurality of disparate surface materials, and wherein providing the output includes providing an output indicative of different spreading characteristics of the powder for each of the disparate surface materials.

15. The method of claim 11, wherein the blade has respective portions having different surface characteristics, and wherein providing the output includes providing an output indicative of different spreading characteristics of regions of the powder respectively corresponding to one of the different disparate surface characteristics.

16. The method of claim 15, wherein at least one of the steps has a plurality of disparate surface characteristics, and wherein providing the output includes providing an output indicative of different spreading characteristics of the powder for each of the disparate surface characteristics in combination with the surface characteristics of the respective portions of the blade.

17. The method of claim 11, wherein spreading the powder includes spreading the powder within the powder bed over the stepped substrate by creating powder having different thicknesses corresponding to the thicknesses of the respective steps.

18. The method of claim 11, wherein providing the output indicative of spreading characteristics of the powder relative to the respective steps includes providing the output based on denudation of the powder in the powder bed, with regions not exhibiting denudation being indicative of desirable powder spreadability.

19. The method of claim 11, wherein providing an output indicative of spreading characteristics of the powder relative to the respective steps includes providing the output based on denudation of the powder in the powder bed relative to characteristics of the stepped substrate selected from the group of: thickness, texture, material type, roughness, and a combination thereof.

20. An apparatus comprising:

a powder bed including sidewalls and a bottom wall having a substrate, the substrate having a lower surface and a stepped upper surface having respective steps at different heights relative to the other steps, the sidewalls and substrate forming an enclosure to hold powder, the upper surface exhibiting characteristics selected from the group of: a smooth surface, a textured surface, surface portions having different materials, and a combination thereof; and a powder spreader including a blade and an actuator to actuate the blade across an upper surface of the powder bed and therein spread powder within the powder bed over the stepped substrate, the blade having a surface exhibiting characteristics selected from the group of: a smooth surface; a textured surface, surface portions having different materials, and a combination thereof.

* * * * *